(12) United States Patent
Chen et al.

(10) Patent No.: US 11,390,210 B2
(45) Date of Patent: Jul. 19, 2022

(54) LUGGAGE RACK ABLE TO ILLUMINATE

(71) Applicant: WINBO-DONGJIAN AUTOMOTIVE TECHNOLOGY CO., LTD., Foshan (CN)

(72) Inventors: Yongbo Chen, Foshan (CN); Zhihai Zhang, Foshan (CN); Wei Hu, Foshan (CN); Wenxiang He, Foshan (CN); Jie Yang, Foshan (CN); Weiting He, Foshan (CN)

(73) Assignee: WINBO-DONGJIAN AUTOMOTIVE TECHNOLOGY CO., LTD., Foshan (CN)

(*) Notice: Subject to any disclaimer, the term of this patent is extended or adjusted under 35 U.S.C. 154(b) by 295 days.

(21) Appl. No.: 16/713,019

(22) Filed: Dec. 13, 2019

(65) Prior Publication Data

US 2020/0114809 A1    Apr. 16, 2020

Related U.S. Application Data

(63) Continuation of application No. PCT/CN2017/109951, filed on Nov. 8, 2017.

(30) Foreign Application Priority Data

Jun. 14, 2017   (CN) .......................... 201710468749.2

(51) Int. Cl.
    *B60Q 1/26*    (2006.01)
    *B60R 9/04*    (2006.01)
(52) U.S. Cl.
    CPC .............. *B60Q 1/2661* (2013.01); *B60R 9/04* (2013.01)

(58) Field of Classification Search
    CPC .. B60R 9/04; B60R 11/04; B60Q 1/26; B60Q 1/2603
    See application file for complete search history.

(56) References Cited

U.S. PATENT DOCUMENTS

| 4,269,339 A | | 5/1981 | Bott | |
|---|---|---|---|---|
| 4,426,028 A | * | 1/1984 | Bott | .......................... B60R 9/04 224/325 |
| 4,800,470 A | * | 1/1989 | Hartsaw | ............... B60Q 1/0011 362/249.12 |
| 5,306,156 A | * | 4/1994 | Gibbs | .................... B60Q 1/302 439/34 |

(Continued)

FOREIGN PATENT DOCUMENTS

| CN | 2690228 Y | 4/2005 |
|---|---|---|
| CN | 102371942 A | 3/2012 |

(Continued)

OTHER PUBLICATIONS

International search report, PCT/CN2017/109951, dated Mar. 23, 2018 (2 pages).

(Continued)

*Primary Examiner* — Brian D Nash (57) ABSTRACT

A luggage rack able to illuminate includes a body portion (101), fixed on a top of a vehicle. A plurality of illuminators (103) is further included and arranged with the illuminating luggage rack. By arranging the illuminators (103), surrounding vehicles and drivers may easily notice the vehicle having the illuminating luggage rack, ensuring driving safety.

20 Claims, 4 Drawing Sheets

(56) References Cited

U.S. PATENT DOCUMENTS

| | | | | |
|---|---|---|---|---|
| 6,114,954 A * | 9/2000 | Palett | | B60R 9/00 340/475 |
| 8,627,989 B2 * | 1/2014 | Aftanas | | B60R 9/058 224/326 |
| 2003/0029894 A1 * | 2/2003 | Crane | | B60R 9/00 224/319 |
| 2007/0217212 A1 * | 9/2007 | Klinkman | | B60Q 1/24 362/493 |
| 2007/0252409 A1 * | 11/2007 | Clinton | | B60R 9/04 296/185.1 |
| 2011/0240695 A1 * | 10/2011 | Aftanas | | B60Q 1/2661 224/311 |
| 2012/0031939 A1 * | 2/2012 | Jutila | | B60Q 1/24 224/326 |
| 2013/0135880 A1 | 5/2013 | Michie et al. | | |
| 2014/0353350 A1 | 12/2014 | Sirrenberg et al. | | |
| 2015/0138803 A1 * | 5/2015 | Salter | | F21S 41/16 362/510 |
| 2016/0121799 A1 * | 5/2016 | McClintock | | B60R 9/04 224/309 |
| 2017/0066382 A1 * | 3/2017 | Aftanas | | B60R 9/04 |
| 2017/0120805 A1 | 5/2017 | Marchese et al. | | |
| 2018/0222396 A1 * | 8/2018 | Binder | | B60R 9/04 |
| 2019/0176717 A1 * | 6/2019 | Gomes | | B62D 25/06 |
| 2019/0270414 A1 * | 9/2019 | Dellock | | B60R 9/058 |
| 2020/0001797 A1 * | 1/2020 | Chen | | B60R 9/052 |
| 2020/0023783 A1 * | 1/2020 | Jung | | B60R 9/04 |
| 2020/0114808 A1 * | 4/2020 | Chen | | B60R 9/058 |
| 2020/0114809 A1 * | 4/2020 | Chen | | B60R 9/058 |
| 2020/0114829 A1 * | 4/2020 | Chen | | B60R 9/058 |

FOREIGN PATENT DOCUMENTS

| | | |
|---|---|---|
| CN | 205059447 U | 3/2016 |
| CN | 106740517 A | 5/2017 |
| CN | 107089200 A | 8/2017 |
| KR | 100917344 B1 | 9/2009 |

OTHER PUBLICATIONS

Australia First Office Action, Application No. 2017419088, dated Oct. 28, 2020.
Australia Second Office Action, Applicaton No. 2017419088, dated Jan. 14, 2021.

* cited by examiner

LUGGAGE RACK ABLE TO ILLUMINATE

CROSS-REFERENCE TO RELATED APPLICATIONS

The present application is a continuation-application of International (PCT) Patent Application No. PCT/CN2017/109951 filed on Nov. 8, 2017, which claims foreign priority of Chinese Patent Application No. 201710468749.2 filed on Jun. 14, 2017, in the National Intellectual Property Administration of China, the entire contents of which are hereby incorporated by reference in their entireties.

TECHNICAL FIELD

The present disclosure relates to the field of vehicle parts, and in particular to a luggage rack able to illuminate.

BACKGROUND

As economy develops, market penetration and usage of vehicles is increasing remarkably. Therefore, various vehicle parts that can optimize travel experience for travelers may become a hot topic.

A roof luggage rack may be arranged on a top of a suburban utility vehicle (SUV) to provide an aesthetic appearance for the vehicle and to carry articles. The roof luggage rack may assist carrying the luggage. Outdoor equipments, such as a bicycle, a luggage bag, or the like, may be carried on the top of the vehicle to allow a convenient trip for the user. However, luggage racks in the related art may substantially be arranged for carrying articles solely, having a single function.

Therefore, an illuminating luggage rack may be provided to solve the above-mentioned technical problem that the luggage racks in the related art may substantially be arranged for carrying articles only.

SUMMARY OF THE DISCLOSURE

The present disclosure may provide an illuminating luggage rack, able to illuminate and having an alerting function, such that the technical problems of the luggage rack having a single function may be.

To solve the above-mentioned technical problem, a technical solution may be provided.

A luggage rack able to illuminate may be provided. The luggage rack may include a body portion, able to be fixed on a top of a vehicle, and a plurality of illuminators.

The plurality of illuminators may be arranged with the body portion.

According to the above-mentioned luggage rack, the plurality of illuminators may be integrated into the luggage rack, broadening implementations of the luggage rack.

In an embodiment, the body portion of the luggage rack may be fixed on the top of the vehicle via a plurality of mounting bases.

In an embodiment, each mounting base may has two ends, and each of the two ends may define a first through hole. A hollow bolt may extend through the first through hole to fix with the top of the vehicle.

In an embodiment, a plurality of pads may be arranged inside the body portion of the luggage rack corresponding to the plurality of mounting bases. Each mounting base may define a second through hole at a central position. A screw may be arranged to extend through each of the plurality of pads to be received in the second through hole of each mounting base, such that a bottom board of the body portion of the luggage rack may be fixed with the top of the vehicle.

According to the above-mentioned luggage rack, by arranging the plurality of mounting bases, the bottom board of the body portion of the luggage rack may be fixedly connected to the vehicle, such that the luggage rack may not fall off from the vehicle.

In an embodiment, the plurality of illuminators may be connected to a power through a wire, and power may be supplied.

In an embodiment, the wire may extend through the hollow bolt and further extend through the top of the vehicle to reach an inside of the vehicle to connect to the power.

According to the above-mentioned luggage rack, the wire may extend through the hollow bolt to reach the inside of the vehicle, arrangement of the wire may be simplified, and the top of the vehicle may not need to further define a hole.

In an embodiment, one of the two ends of each mounting base may be arranged with a protrusion to fix the illuminator.

In an embodiment, a top end of the protrusion may define a mounting hole, and an end of a top cover of the body portion of the luggage rack may define a receiving hole. A central axis of the mounting hole may be overlapped with a central axis of the receiving hole.

In an embodiment, a bottom end of the illuminator may be arranged with a thread, a side wall of the mounting hole may be arranged with a pattern, and the thread may be coupled with the pattern. The illuminator may extend through the receiving hole and rotate to be fixedly received in the mounting hole, such that the illuminator may be assembled in a detachable manner.

In an embodiment, a rubber plug may be arranged between the illuminator and a side wall of the receiving hole to further fix the illuminator.

According to the above-mentioned luggage rack, by arranging the mounting base, the illuminator may be fixed by screwing, such that the illuminator may be easily detached and replaced.

In an embodiment, the illuminator may be tubular.

In an embodiment, an illuminating unit of the illuminator may be a light emitting diode (LED) chip.

According to the above-mentioned luggage rack, by arranging the LED chip as the illuminating unit, service life and a lighting effect of the illuminator may be improved.

In an embodiment, the luggage rack may further include a control apparatus. The control apparatus may be arranged to control an illuminating mode of the illuminator.

In an embodiment, the illuminating mode may include at least one of a light on mode, a light off mode, a light timer mode, a light intensity mode, and a light color mode.

In an embodiment, the control apparatus may be connected to a main control system of the vehicle. The control apparatus may be arranged to receive a transmission signal during the vehicle running to further control the illuminator.

In an embodiment, the transmission signal may be at least one of a light signal of the vehicle, a signal indicating door open and closed, a vehicle speed signal, and an alerting signal.

In an embodiment, the control apparatus may be connected to the main control system of the vehicle. The control apparatus may be arranged to receive a transmission signal during the vehicle running to further control the illuminator.

In an embodiment, the control apparatus may be controlled manually to further control the illuminator.

According to the above-mentioned luggage rack, the control apparatus may be arranged to control the illuminating mode of the illuminator and may be connected to the main control system of the vehicle, or may be controlled manually, such that the implementations of the luggage rack may be broadened. In various situations, various demands may need to be met, and various control methods may be provided. User experience may be broadened, and functions of the illuminator may be broadened.

To solve the above-mentioned technical problem, another technical solution may be provided.

A luggage rack able to illuminate may include a body portion, and the body portion may be fixedly connected to a top of a vehicle via a plurality of mounting bases. The luggage rack may further include an illuminator.

In an embodiment, the illuminator may be fixedly arranged with the body portion.

In an embodiment, two ends of the mounting base may define two first through holes, and two hollow bolts may extend through the two first through holes to fix the mounting base with the top of the vehicle.

To solve the above-mentioned technical problem, still another technical solution may be provided.

A vehicle may be provided and include: a top and a luggage rack arranged on the top. The luggage rack may be the above-mentioned luggage rack able to illuminate.

The present disclosure may provide a luggage rack able to illuminate. The luggage rack may be fixed on the top of the vehicle via the mounting base, such that service life of the luggage rack may be improved. By arranging illuminator with the luggage rack, functions of the luggage rack may be broadened. The illuminating mode may be controlled by the control apparatus, such that surrounding vehicles and drivers may easily notice the vehicle arranged with the luggage rack, ensuring driving safety, optimizing user experience, and broadening functions of the luggage rack. Further, the luggage rack may have an extended service life, and may be adapted to various environments, meeting various demands of the user. According to the present disclosure, the technical problem of using the luggage rack for carrying articles solely may be solved.

DETAILED DESCRIPTION

Technical solutions of the present disclosure may be clearly illustrated in details by referring to the drawings. Obviously, the illustrated embodiments are only a part of but not all of the embodiments. Based on the embodiments of the present disclosure, other embodiments obtained by the ordinary skilled in the related art without any creative work shall be within the scope of the present disclosure.

To be noted that, direction terms used herein, such as "top", "bottom", "front", "back", "left", "right", "inside", "outside", "side", and the like, may refer to a relative direction as shown in the drawings. Therefore, the direction terms may be used to clearly illustrate and understand the present disclosure, but not to imply an apparatus or an element must be located at a particular position or operated and constructed in a particular manner. Therefore, the direction terms shall not limit the scope of the present disclosure.

To further illustrate the present disclosure, a luggage rack able to illuminate may be illustrated in details by accompanying with the drawings.

Figure 1:
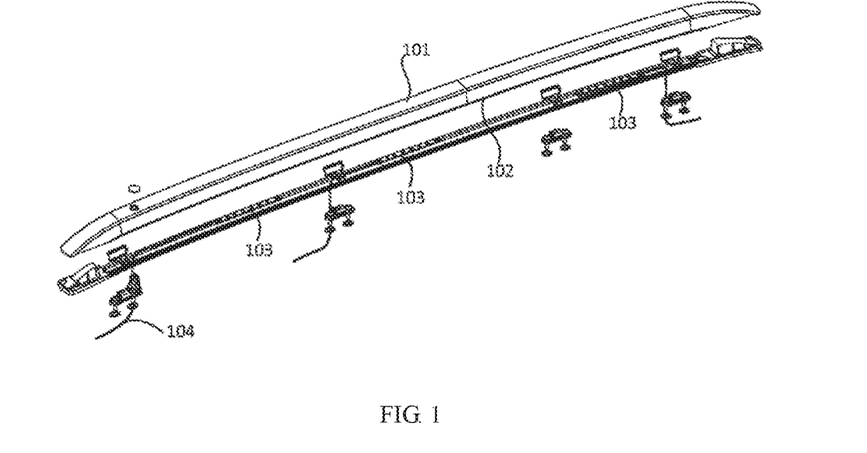
FIG. 1 is an explosive perspective view of an entire structure of a luggage rack able to illuminate according to a first embodiment of the present disclosure.

As shown in FIG. 1, an explosive perspective view of a luggage rack able to illuminate is provided according to the present disclosure. The luggage rack may include a body portion 101. To be specific, a bottom board 102 may be arranged inside the body portion 101. The bottom board 102 may be arranged to support the body portion of the luggage rack. Further, the luggage rack able to illuminate may further include an illuminator 103. The illuminator 103 may be arranged with the body portion 101. In an embodiment of the present disclosure, the illuminator 103 may be connected to a wire 104 to further connect to a main circuit of a vehicle to achieve an electrical connection. The wire 104 may be arranged inside the body portion 101. Further, the wire 104 may be preferably fixed along a cross shaft of the bottom board 102. Power may be supplied by other means, such as by connecting to an independent battery. According to the present disclosure, the luggage rack able to illuminate may achieve more functions carry articles only.

Figure 2:
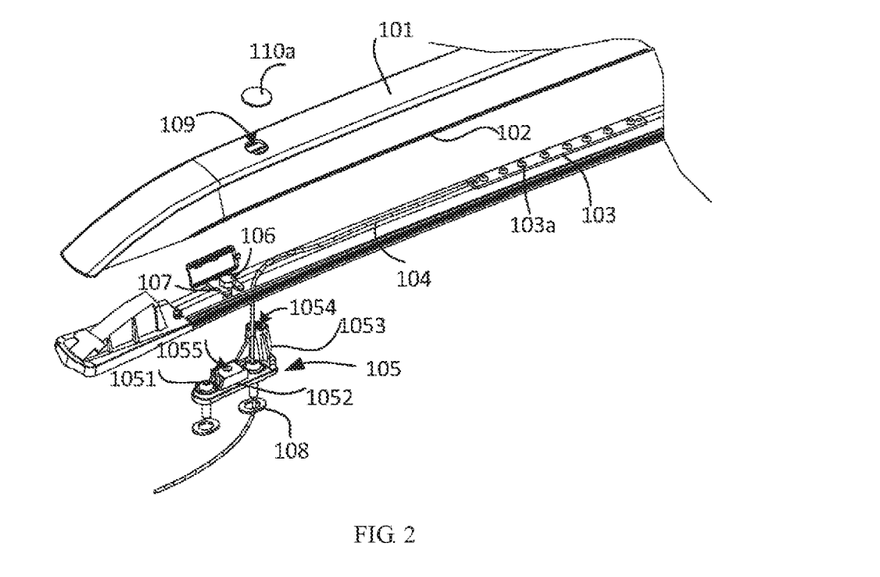
FIG. 2 is enlarged view of a portion of a luggage rack shown in the first embodiment of the present disclosure.

To be specific, as shown in FIG. 2, an enlarged view of a portion of a first embodiment is provided. A plurality of illuminating units 103a of the illuminator may be arranged in an array. The plurality of illuminating units 103a may be fixedly arranged on the bottom board 102 along an extension direction of the bottom board. A length of the array of the plurality of illuminating units 103a may be adjusted based on actual demands, and will not be limited herein. In the present embodiment, the plurality of illuminating units 103a may be arranged into an array of 1*n. The n may be the number of the illuminating units 103a arranged along extension direction of the bottom board. It may be understood that, to adjust a lighting effect, the array may be 2*n, 3*n, 4*n, or the like. Typically, to achieve a better lighting effect and to improve service life, the plurality of illuminating units 103a may be a plurality of LED beads, or other small sized illuminating beads. To be noted that, modification of the illuminating units may still be within the scope of the present disclosure.

Figure 3:
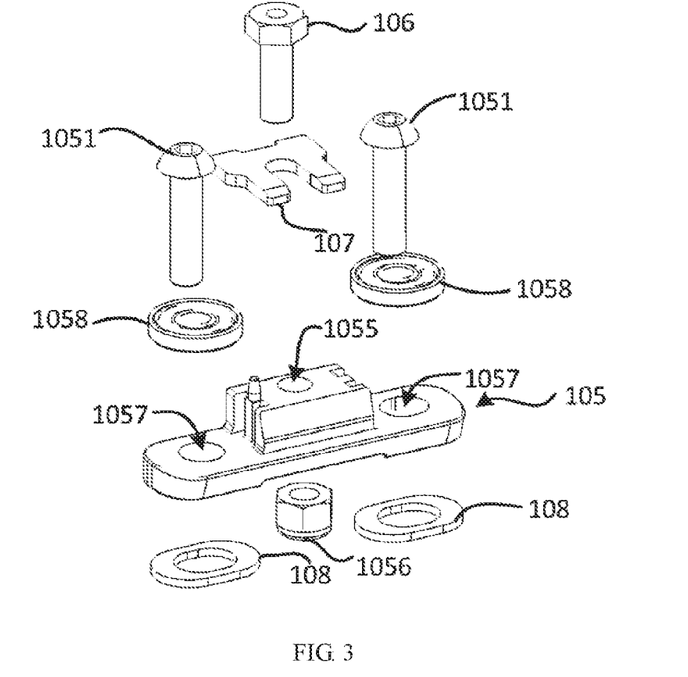
FIG. 3 is an explosive perspective view of a mounting base shown in the first embodiment of the present disclosure.

As shown in FIG. 2 and FIG. 3, FIG. 3 is an explosive perspective view of a mounting base of the embodiment shown in FIG. 2. The bottom board 102 of the body portion of the luggage rack may be connected to the vehicle via a plurality of screws 106 and a plurality of mounting bases 105. Each mounting base 105 has two ends, and each of the two ends may define a first through hole 1057, a hollow bolt 1051 may extend through the first through hole 1057 to fix with the top of the vehicle. The mounting base 105 may define a second through hole 1055 at a central position. Further, a gasket 108 may be arranged between the mounting base 105 and the vehicle. A pad 107 may be arranged on the bottom board of the luggage rack. Each screw 106 may extend through the pad 107. A central axis of the screw 106 may be overlapped with a central axis of the second through hole 1055. In such a way, after the screw 106 extends through the pad arranged on the bottom board 102 and is received into the second through hole 1055, the screw 106 may further be rotated to fix with a nut 1056 received in the second through hole 1055. As the bottom board 102 may be arranged between the pad 107 and the nut 1056, when the screw 106 is rotated to be received within the nut 1056, the pad 107 may press the bottom board 102 to fixedly connect to the mounting base 105. As the mounting base 105 may be fixed on the top of the vehicle via the two hollow bolts 1051, the bottom board 102 may be fixed on the top of the vehicle by the means as described in the above, that is, the body portion 101 of the luggage rack may be fixed with the top of the vehicle.

Further, in some embodiments, the mounting base 105 may further include a protrusion 1053 arranged on one of the two ends, and a top end of the protrusion 1053 may define a mounting hole 1054. To be noted that, based on actual demands, the protrusion 1053 may be arranged with the mounting base 105, or may be omitted. Typically, the mounting base 105 may be arranged to fix the luggage rack with the vehicle. Only when the illuminator is arranged to be fixed, the protrusion 1053 may be required. Therefore, in the present embodiment, the mounting bases 105 arranged at locations of which the illuminator 103 is absent may not be arranged with the protrusion 1053.

Figure 4:
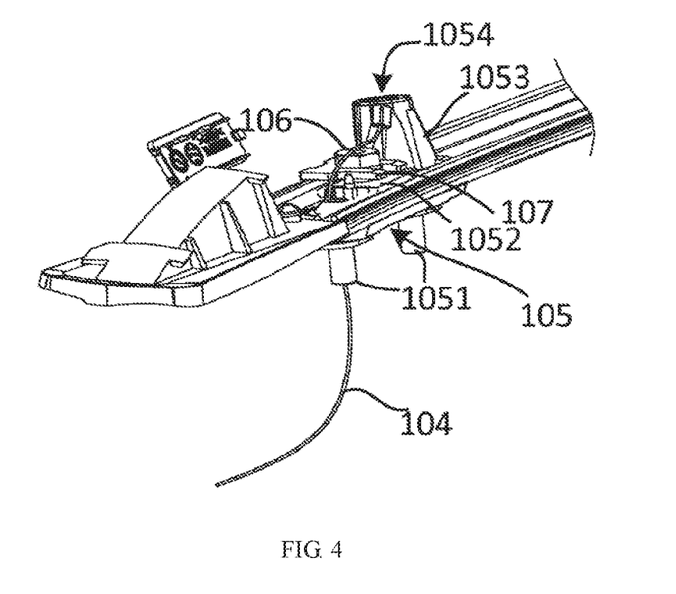
FIG. 4 is a schematic view showing an assembling of a structure shown in the first embodiment of the present disclosure.

As shown in FIG. 4, a schematic view of the structure after assembling is provided. Further, the wire 104, which is connected to the illuminator 103, may be fixed on the bottom board 102 along the extension direction of the bottom board 102, and may extend through any of the two hollow bolts 1051 to reach an inside of the vehicle to connect to the main circuit of the vehicle, such that power may be supplied to the illuminator 103.

Figure 5:
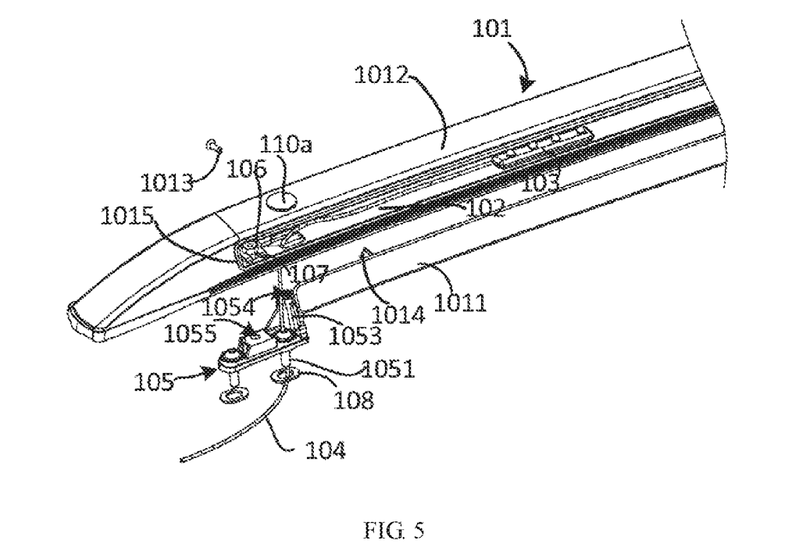
FIG. 5 is a schematic view showing the structure of the first embodiment after the assembling.

Further referring to FIG. 2 and FIG. 5, FIG. 5 is a schematic view showing the structure of the first embodiment after the assembling. In an embodiment of the present disclosure, the body portion 101 of the luggage rack may include a side cover 1011 and a top cover 1012. The top cover 1012 may be in a streamline, and two ends of the top cover may be bent. The side cover 1011 may be arranged to a side of the top cover 1012 via a screw 1013. In the present embodiment, the screw 1013 may be a self-tapping screw. Further, a water-proof rubber pad 1015 may be arranged at an intersection between the side cover and the top cover. In the present embodiment, the side cover 1011 may be made of transparent materials, such as plastics, allowing lights emitted from the illuminator to pass through. The top cover 1012 may be made of an inert alloy, such as an aluminum alloy or a titanium alloy, to provide a firm structure and improve service life. To improve the illuminating effect, the top cover and the side cover may both be made of the transparent materials, such as tempered glass, a polymethyl methacrylate (PMMA) material, a transparent polycarbonate material, transparent plastics, or the like. In such a way, the entire luggage rack may be illuminated, improving an illuminating range. It may be understood that, any modification of the above-mentioned materials may be within the scope of the present disclosure.

Further, an end of the top cover 101 may define a receiving hole 109. A central axis of the receiving hole 109 may be overlapped with a central axis of the mounting hole 1054. The mounting hole 1054 may be defined at a top end of the mounting base 1053 of the mounting base 1053. In the present embodiment, the receiving hole 109 may be sealed by a rubber plug 110.

Figure 6:
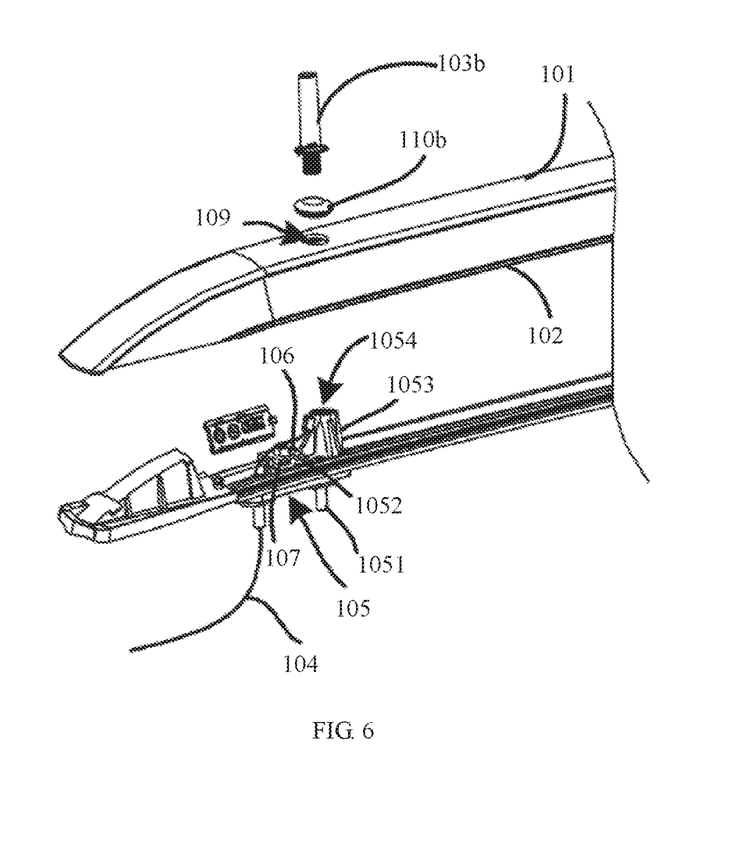
FIG. 6 is an explosive perspective view of a second embodiment of the present disclosure.

As shown in FIG. 6, another embodiment of the present disclosure is provided. In the present embodiment, the illuminator 103b may be an illuminating stick. The illuminating stick may include an illuminating portion at an upper portion of the stick and a power-supply fixing portion at a bottom portion of the stick. The power-supply fixing portion at the bottom portion of the stick may be arranged with a thread. The thread may be similar to a thread arranged at a bottom of a bulb. Therefore, in the present embodiment, the illuminator 103b may be a LED stick. The LED stick may be inserted perpendicularly into the receiving hole 109 defined at an end of the body portion of the luggage rack and may further be fixed with the mounting base 1053. In the present embodiment, the rubber plug 110b may define a hole at a center of the rubber plug, allowing the illuminator 103b to extend through. The illuminator 103b may successively extend through the rubber plug 110b, the receiving hole 109, and may be rotated to be received into the mounting hole 1054 of the mounting base 1053. As the rubber plug 110 may be arranged, further, the wire 104 may extend through any one of the hollow bolts 1051 to connect to a side wall of the mounting hole 1054, such that the illuminator 103b may be connected to the wire, and power may be supplied to the illuminator 103b.

Figure 7:
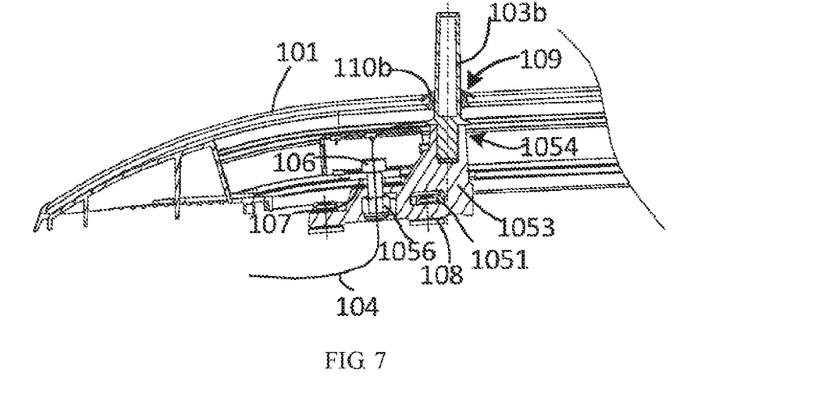
FIG. 7 is a cross sectional view of a structure of the second embodiment after assembling.

Further, as shown in FIG. 7, a cross sectional view of a structure of the second embodiment after assembling is provided. It is shown more clearly that, at an end of the body portion 101 of the luggage rack, the illuminator 103b may be a stick, the illuminator 103b may be received in the mounting hole 1054 via the thread arranged at the bottom of the illuminator 103b. The wire 104 may extend from the side wall of the mounting hole 1054, through the screw 106 to connect to the main circuit of the vehicle. The illuminating portion of the upper portion of the illuminator 103b may extend through the receiving hole 109, protruding to an outside of the body portion 101 of the luggage rack. The rubber plug 110b may be arranged to seal between the illuminating portion and a side wall of the receiving hole 109.

To be noted that, the illuminating stick 103b provided in the present embodiment may be suitable while driving on urban roads. The illuminating stick 103b may substantially be arranged to search vehicles and alert other vehicles behind the vehicle with the illuminating stick 103b. A length of the stick may not be limited by the present disclosure. When driving in a desert or along a mountain road, the length of the illuminating stick 103b may be extended. The illuminating stick 103b with extended length may be arranged while driving along a road having an uneven surface, such that the vehicle may be observed by other drivers, a possibility of having an accident may be reduced, suitable for a fleet of vehicles to have a field trip.

To be noted that, the present disclosure may further include a control apparatus, arranged to control the illuminating mode of the illuminator 103. In an embodiment of the present disclosure, the illuminating mode may include at least one of: a light-on mode, a light-off mode, a light-timer mode, a light intensity mode, and a light color mode.

The control apparatus may be connected to a main control system of the vehicle to receive a transmission signal during vehicle running to further control the illuminator. In one embodiment of the present disclosure, the transmission signal may include at least one of a light signal of the vehicle, a signal indicating door open or closed, a vehicle speed signal, and an alerting signal.

Further, the control apparatus may be set by manual operation to further control the illuminator. In an embodiment of the present disclosure, the manual operation may include pressing or rotating a physical button, that is, the vehicle may be arranged with an adjustment button for the user to press and rotate by hand to control the illuminator. Alternatively, the manual operation may be integrated into a control panel of the vehicle to provide a simple arrangement. In some other embodiments, controlling the illuminator may be achieved by voice recognition, face recognition, posture recognition or other means. Alternatively, the control apparatus may be connected to a mobile terminal, operations may be performed on an application (APP) of the mobile terminal to control the illuminator. Of course, the mobile terminal may be a mobile phone, a tablet, a watch or other mobile devices. The control apparatus may be connected to the mobile terminal via Wireless Fidelity (WiFi), Bluetooth, Near Field Communication (NFC), or the like. The control apparatus may be controlled by means of hands-free, such as by voice, by face recognition, or the like.

The control apparatus may control the illuminating mode of the illuminator, may be connected to the main control system of the vehicle, and may be control manually, further increasing implementations of the luggage rack. Various mean of controlling may be provided based on user's demands at various situations, creating more user experience, further broadening functions of the illuminator.

Figure 8:
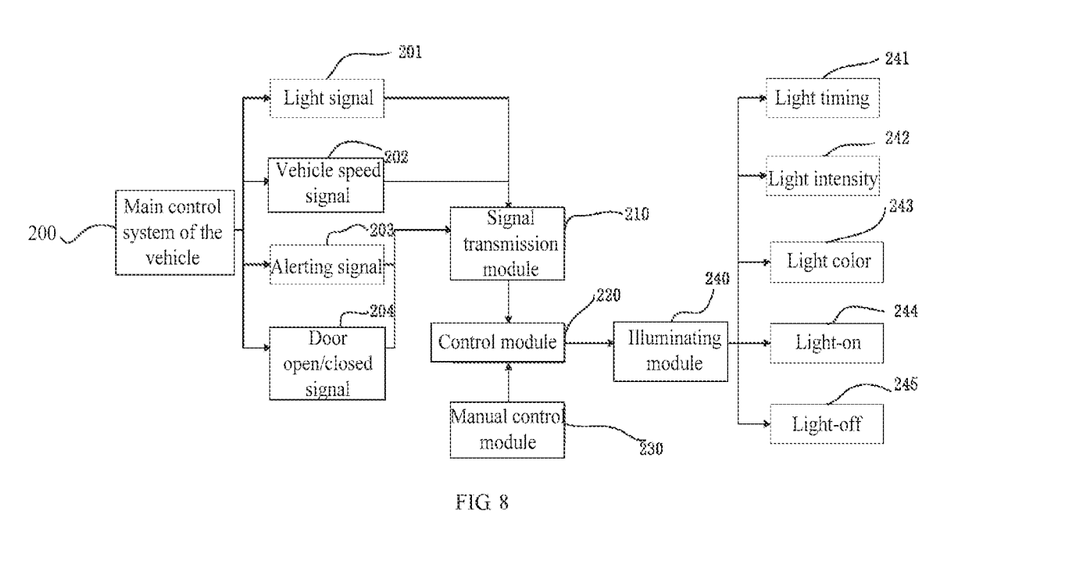
FIG. 8 is a systemic diagram of a control apparatus according to the present disclosure.

Further, as shown in FIG. 8, a structural diagram of a system of the control apparatus is provided according to an embodiment of the present disclosure. In the present embodiment, a control system may include a control module 220, an illuminating module 240, a signal transmission module 210. The control module 220 may be arranged to receive a signal transmitted from the signal transmission module 210 to control the illuminator of the illuminating module 240 to achieve at least one of: lighting on 244, lighting off 245, light timing 241, light intensity adjustment 242, and changing of light color 243. Of course, when the control module 220 intermittently controls the light timing 241 of the lighting on 244 and the lighting off 245 of the illuminator of the illuminating module 240, the illuminator may flash 243, and a frequency of flashing of the illuminator may further be controlled to achieve a function of alerting. The control module 220 may control a current and a voltage of the illuminating module 240, or control a number of the illuminating sticks of the array to light on to control the light intensity 242 of the illuminator. In addition, by arranging the LED light source, emitting various colors of lights may be achieved through the techniques available in the related art.

For example, by adjusting the light color 243 of the illuminating module 240, the illuminator may be suitable for more scenarios. For example, in a rainy and foggy day, a red light may have a better penetration effect, therefore, the control module 220 may be arranged to set the light color 243 of the illuminator of the illuminating module 240 to be red. Alternatively, during festivals or at a party, the control module 220 may control the illuminating module 240 to light on 243 and flash 240 and change the light color 243 to create an atmosphere for the party.

Further, the signal transmission module 210 may receive the signal transmitted from the main control system 200 of the vehicle, such as a light signal 201. In the present embodiment, the light signal 201 may include a brake light, a left/right signal, a front light, and the like. The illuminating module 240 and the above-mentioned lights and signals may work at the same time to further achieve the alerting function. For example, when a driver brakes, the signal transmission module 210 may detect that the brake light of the light signal 201 is activated, the light signal 201 may be transmitted to the control module 220, the control module may further control the illuminating module 240. After the illuminating module controls the illuminator to light on 244, vehicles at the behind may be alerted, ensuring driving safety.

Further, the signal transmission module 210 may receive the signal transmitted from the main control system 200 of the vehicle, such as a speed signal 202. For example, when the speed of the vehicle is dramatically decreased, the control module 220 may receive the speed signal 202 transmitted from the signal transmission module 210 to further control the illuminating module 240 to be activated, alerting surrounding vehicles.

Further, the signal transmission module 210 may receive the signal transmitted from the main control system 200 of the vehicle, such as an alerting signal 202 and the signal indicating door open and closed 204. For example, when a user uses a remote controller to perform operations of unlocking the door, after the door is open, the signal indicating a door open 204 may be transmitted from the signal transmission module 210 and received by the control module 220. The control module 220 may further control the illuminating module 240 to light on 244 the illuminator, enabling the user to find the vehicle easily, improving recognition of the vehicle, and optimizing the user experience.

Further, the illuminating module 220 may be controlled by a manual control module 230. When the vehicle is driving in an environment with poor visibility, such as in a rainy or foggy day, the driver may manually control the illuminating module 240 and set the illuminating mode of the illuminating module 240.

To summarize, the present disclosure may provide an illuminating luggage rack. For being used in various situations, an array of light strips or light sticks may be arranged as an illuminator. By arranging various structural types of illuminators, and by arranging a control apparatus to control an illuminating mode of the illuminator, surrounding vehicles and/or drivers may easily observe the vehicle with the illuminator, ensuring driving safety. The arrangement may be suitable for various situations, optimizing user experience and effectively broadening usage of the luggage rack. The technical problem of the roof luggage rack in the related art being used for carrying article solely may be solved.

The above description illustrates preferred implementations only. It should be noted that, to ordinary skilled in the related art, without departing from the principle of the present disclosure, various modifications and polishing may be performed, and such modifications and polishing shall be deemed within the scope of the present disclosure.

What is claimed is:

1. A luggage rack able to illuminate, comprising:
   a body portion, capable of being arranged on a top of a vehicle, defining a space, and comprising a top cover, wherein the top cover defines a receiving hole;
   a bottom board, arranged inside the body portion, received in the space, disposed close to the top of the vehicle, and opposite to the top cover;
   a plurality of illuminating units fixedly arranged on the bottom board; and
   an illuminator, extending through the receiving hole and further protruding to an outside of the body portion.

2. The luggage rack able to illuminate according to claim 1, wherein the body portion is capable of being fixedly connected to the top of the vehicle via a plurality of mounting bases.

3. The luggage rack able to illuminate according to claim 2, wherein each of the plurality of mounting bases has two ends, each of the two ends defines a first through hole, and a hollow bolt is arranged to extend through the first through hole to fix with the top of the vehicle.

4. The luggage rack able to illuminate according to claim 3, wherein the illuminator and each of the plurality of illuminating units is connected to a power via a wire to achieve power supply.

5. The luggage rack able to illuminate according to claim 4, wherein the wire is arranged to extend through the hollow bolt and further extend through the top of the vehicle to reach an inside of the vehicle to connect to the power.

6. The luggage rack able to illuminate according to claim 5, wherein
the body portion is arranged with a plurality of pads corresponding to the plurality of mounting bases;
each of the plurality of mounting bases defines a second through hole at a central position; and
a screw is arranged to extend through each of the plurality of pads to be received in the second through of each of the plurality of mounting bases, such that a bottom board of the luggage rack is capable of being fixed with the top of the vehicle.

7. The luggage rack able to illuminate according to claim 6, wherein
one of the two ends of each of the plurality of mounting bases is arranged with a protrusion; and
the illuminator is fixed by the protrusion.

8. The luggage rack able to illuminate according to claim 7, wherein
a top of the protrusion defines a mounting hole;
a central axis of the mounting hole and a central axis of the receiving hole is overlapped.

9. The luggage rack able to illuminate according to claim 8, wherein
a bottom end of the illuminator is arranged with a thread, a side wall of the mounting hole is arranged with a pattern, the thread is arranged to fit with the pattern; and
the illuminator is fixedly received in the mounting hole by rotating, such that the illuminator is assembled in a detachable manner.

10. The luggage rack able to illuminate according to claim 9, wherein a rubber plug is arranged between the illuminator and a side wall of the receiving hole to further fix the illuminator.

11. The luggage rack able to illuminate according to claim 1, wherein the illuminator is in a shape of a stick.

12. The luggage rack able to illuminate according to claim 1, further comprising a control apparatus, wherein the control apparatus is arranged to control an illuminating mode of the illuminator.

13. The luggage rack able to illuminate according to claim 12, wherein the illuminating mode comprises at least one of: a light-on mode, a light-off mode, a light-timer mode, a light intensity mode, and a color mode.

14. The luggage rack able to illuminate according to claim 13, wherein
the control apparatus is capable of being connected to a main control system of the vehicle and arranged to be able to receive a transmission signal during vehicle driving; and
the control apparatus is arranged to control the illuminator.

15. The luggage rack able to illuminate according to claim 14, wherein the transmission signal comprises at least one of: a light signal of the vehicle, a signal indicating door open or closed, a vehicle speed signal, and an alerting signal.

16. The luggage rack able to illuminate according to claim 15, wherein the control apparatus is arranged to be able to accept a manual operation to further control the illuminator.

17. The luggage rack able to illuminate according to claim 16, wherein the manual operation comprises pressing a physical button, a voice control, and an operation on a mobile terminal, wherein the mobile terminal is connected to the control apparatus.

18. An luggage rack able to illuminate, comprising:
a bottom board;
a body portion, capable of being fixedly connected to a top of a vehicle via a plurality of mounting bases, defining a space, and comprising a top cover, wherein the top cover defines a receiving hole; and the bottom board is arranged inside the body portion, received in the space, disposed close to the top of the vehicle, and opposite to the top cover;
a plurality of illuminating units, fixedly arranged on the bottom board; and
an illuminator, fixedly arranged with the illuminating luggage rack, extending through the receiving hole and further protruding to an outside of the body portion.

19. The luggage rack able to illuminate according to claim 18, wherein each of the plurality of mounting bases defines a first through hole, and a hollow bolt is arranged to extend through the first through hole and fixed with the top of the vehicle.

20. A vehicle, comprising:
a top; and
the luggage rack able to illuminate, comprising:
a body portion, capable of being arranged on a top of a vehicle, defining a space, and comprising a top cover, wherein the top cover defines a receiving hole; and
a bottom board, arranged inside the body portion, received in the space, disposed close to the top of the vehicle, and opposite to the top cover;
a plurality of illuminating units, fixedly arranged with the body portion on the bottom board; and
an illuminator, extending through the receiving hole and further protruding to an outside of the body portion.

* * * * *